UNITED STATES PATENT OFFICE.

PETER A. KLINE, OF BLOOMSBURG, PENNSYLVANIA.

EXPLOSIVE.

No. 858,874.    Specification of Letters Patent.    Patented July 2, 1907.

Application filed May 18, 1906. Serial No. 317,565.

*To all whom it may concern:*

Be it known that I, PETER A. KLINE, a citizen of the United States, residing at Bloomsburg, in the county of Columbia, State of Pennsylvania, have invented certain new and useful Improvements in Explosives, of which the following is a description.

My invention has for its object to produce a powerful safe and inexpensive explosive powder, which will be quick acting and will not leave after firing either smoke or fumes, and which can be quickly manufactured without danger to the person making it, and without the necessity for expensive apparatus.

My invention is particularly intended to produce a powder which will be ready for immediate use without the necessity for grinding it, or for drying it by heat.

In preparing my explosive, I first mix glucose, molasses and sugar of milk to form a syrup, and into this syrup I stir the following additional ingredients, tannic acid, oxalic acid, turpentine or gin, oak bark, shellac and chlorate of potassium, the proportions of these additional ingredients being such that the moisture present in the syrup is at once absorbed and a dry granular substance is formed ready for immediate use without the necessity for further treatment.

The relative proportions of the syrup and the other ingredients may be varied, but I have usually used the syrup in the proportion of 50 per cent to 50 per cent of the other ingredients mentioned, the syrup being composed of 20% molasses, 23% glucose, and 7% sugar of milk, the molasses preferably consisting of about 20% water and 80% sugar, while the other ingredients are used preferably in the following proportions: tannic acid 10 per cent; oxalic acid, 5 per cent; turpentine or gin 1 per cent; powdered oak bark 2 per cent; alcoholic solution of shellac 2 per cent; and chlorate of potassium 30 per cent, making a total of 50 per cent.

The precise proportions may be varied, and other similar materials may be substituted for the oak bark and for the shellac.

For some purposes I find it desirable to add a small proportion of sulfur either in the form of flower of sulfur, or in the form of powdered mustard. The sulfur if used should not exceed a proportion of about one grain to a pound of the powder, the purpose of adding the sulfur being to facilitate ignition.

The shellac may be omitted if desired, without affecting the explosive qualities of the powder, but I prefer to use it as it seems to facilitate the quick drying of the powder, and to form a glaze for the grains which probably tends to prevent their deterioration when exposed to the air.

The sugar of milk may be omitted if desired. The glucose may be used in liquid form or in dry form, as may be desired. The glucose and molasses either with or without the sugar of milk readily forms a syrup without heating, though the formation of the syrup may be hastened by heating slightly.

The additional ingredients may be mixed together before being introduced into the syrup, but I find that satisfactory results are produced if they are severally introduced and stirred into the syrup. Whether mixed together before being introduced into the syrup, or introduced severally, the syrup should be stirred thoroughly as they are introduced, the stirring serving to mix the ingredients thoroughly, and also, as the moisture is absorbed, serving to cause the mixture to assume a granular condition.

I have found that within eight minutes from the introduction of the additional ingredients into the syrup the mass is converted into a dry granular powder ready for immediate use.

The powder made as above described, cannot be set off by concussion, but is readily set off by an electric spark or fuse or other flame. It is more powerful than any of the blasting powders or powders used in firearms, with which I am familiar, and acts more quickly. In its action it resembles dynamite, in that it acts downward. It is smokeless and leaves no fumes or odor, and seems to produce less sound than other powders.

I have found that powder made as above described, does not deteriorate with age, but on the contrary seems to improve the longer it is kept. It has been used successfully as a blasting powder, and also as a powder for firearms and ordnance.

It will, of course, be understood that I do not wish to be restricted to the precise proportions of the ingredients above specified, as they may obviously be varied according to the precise character of the powder desired, as regards strength and other qualities.

Having thus described my invention, what I claim as new and desire to secure by Letters Patent, is:—

1. An explosive composition consisting of water, sugar, tannic acid, oxalic acid, a liquid hydrocarbon and chlorate of potassium, in or about the proportions specified.

2. An explosive composition comprising the following ingredients in the proportions specified, water, sugar, tannic acid, oxalic acid, turpentine and chlorate of potassium.

3. An explosive composition, comprising the following ingredients in the proportions specified: molasses twenty per cent, glucose twenty three per cent, sugar of milk seven per cent, tannic acid ten per cent, oxalic acid five per cent, turpentine one per cent, powdered oak bark two per cent, alcoholic solution of shellac two per cent, and chlorate of potassium thirty per cent.

In testimony whereof I affix my signature, in presence of two witnesses.

PETER A. KLINE.

Witnesses:
GEORGE F. BEERS,
A. P. GREELEY.